United States Patent

Reilly, Sr.

[11] Patent Number: 5,148,640
[45] Date of Patent: Sep. 22, 1992

[54] MANAGEABLE AWNING SYSTEM

[76] Inventor: Robert M. Reilly, Sr., 810 Barry St., Miami Beach, Fla. 33140

[21] Appl. No.: 718,369

[22] Filed: Jun. 20, 1991

[51] Int. Cl.$^5$ .............................. E04B 1/12
[52] U.S. Cl. ........................... 52/74; 135/89
[58] Field of Search ..................... 52/73–77; 135/89; 160/385, 378, 394, 392, 395

[56] References Cited

U.S. PATENT DOCUMENTS

| | | | |
|---|---|---|---|
| 2,568,048 | 9/1951 | Arnold | 135/89 |
| 4,192,112 | 3/1980 | Reilly, Sr. | 52/222 |
| 4,484,777 | 11/1984 | Michel | 135/89 |
| 4,634,172 | 1/1987 | Duda | 135/89 |
| 4,665,671 | 5/1987 | Sarvis | 52/74 |
| 4,757,854 | 7/1988 | Rippberger | 160/378 |
| 4,763,452 | 8/1988 | Harvey | 160/395 |
| 4,967,424 | 11/1990 | Stegmeier | 160/395 |

FOREIGN PATENT DOCUMENTS

| | | | |
|---|---|---|---|
| 197808 | 8/1978 | Fed. Rep. of Germany | 135/89 |
| 415233 | 3/1991 | United Kingdom | 135/89 |

Primary Examiner—David A. Scherbel
Assistant Examiner—Michele A. Van Patten
Attorney, Agent, or Firm—Francis X. Bradley, Jr.

[57] ABSTRACT

A manageable awning system consisting of a headbar adapted for mounting on a building or the like for support and connected by rafters to a frontbar adapted for mounting on posts and a pliable awning banner with a conformable semi-rigid plastic strip attached to its rearward and forward edges for easy insertion into and removal from spanwise channels in the headbar and the drawbar which is mounted on the frontbar through connecting clips drawn down by threaded nuts and bolts to pull the banner tight and smooth; the semi-rigid plastic edge strips of the banner and the fabric flaps attaching it to the rafters are formed to break away under heavy wind loads.

3 Claims, 5 Drawing Sheets

MANAGEABLE AWNING SYSTEM

SUMMARY OF THE INVENTION

This invention involves improvements to the pliable awning system disclosed by this inventor in U.S. Pat. No. 4,192,112. The awning trade, architects and building code authorities are moving toward a more rational analysis and control over fabric structures, whether attached to buildings or to free-standing supports. Thus, after having been practiced as an art for decades, the awning trade is now evolving as an engineering science.

In the southeastern United States where this inventor practices the trade, building codes are being proposed requiring for the first time that awning banners be removable easily and simply from supporting structures or, otherwise, to be designed to withstand or break away in worst-case wind loading conditions such as those encountered in tropical storms and hurricanes common to the southeast. Typically, under these extreme wind conditions canvas awning banners have been considered expendable and expected to come apart thereby relieving the loads on support structures. Modern awning fabrics, however, such as vinyl coated dacron or teflon coated fiberglass are so strong that before tearing apart in high winds they are capable of transmitting destructive loads not only to awning frames and supports but even to buildings to which they may be attached.

To design awning systems capable of withstanding maximum wind loads associated with rare and unpredictable storms would result in heavy, cumbersome and expensive supporting structures and otherwise unnecessary building reinforcements.

Therefore, a principal object of this invention is to improve the pliable awning system disclosed in U.S. Pat. No. 4,192,122 by providing means at both the frontbar and headbar for more readily mounting, tensioning and smoothing the awning banner and more easily removing it. This improvement becomes increasingly useful as the length of the banner increases by minimizing the skill and manpower required to mount it or, especially, in the face of impending storms, to remove it.

Another object of this improvement is to exploit the predictable and lasting uniformity of the strength of modern awning banner fabrics in order to provide a means for the break away of the fabric under a specified load at the headbar, at the drawbar used for tightening the banner at the frontbar, and at the awning frame rafters.

DETAILED DESCRIPTION OF THE INVENTION

Figure 1:
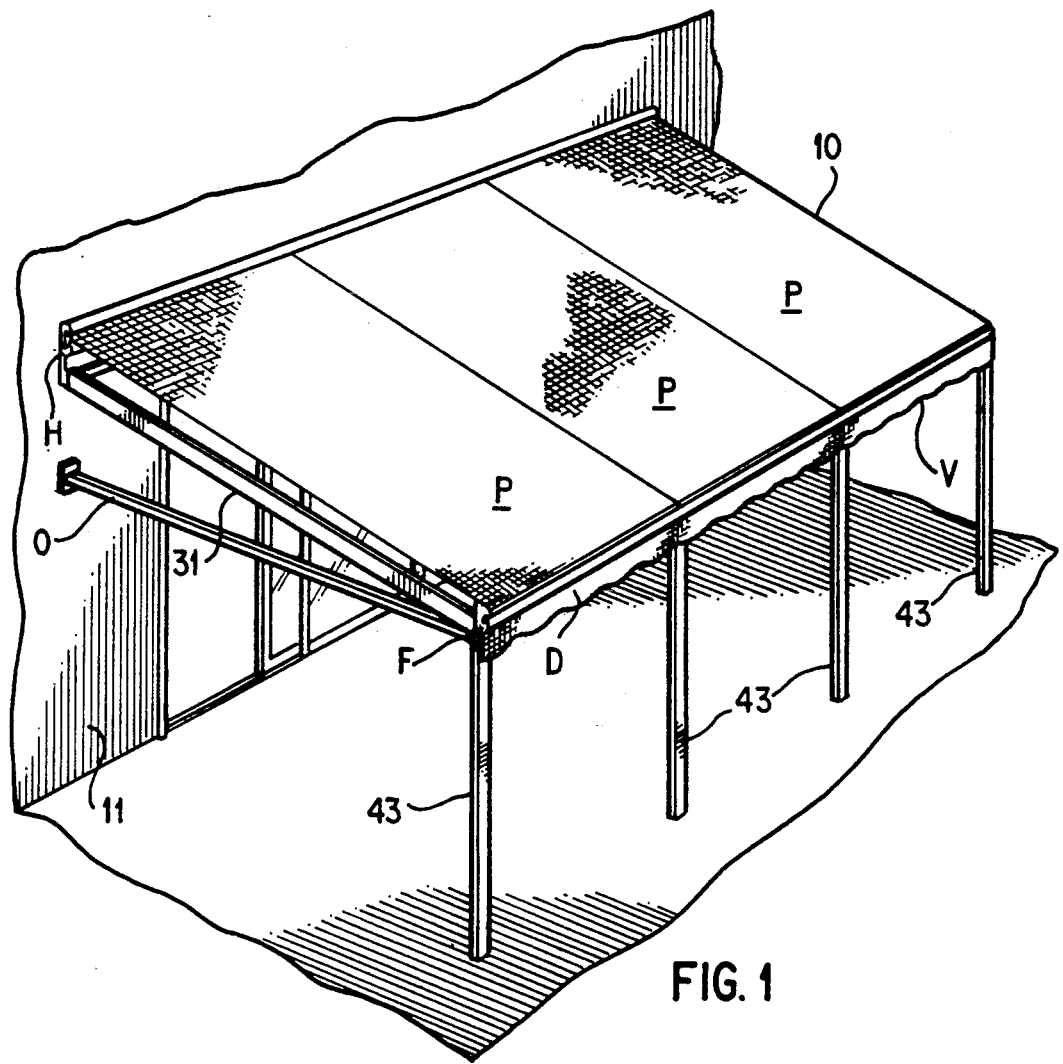
FIG. 1 is a general perspective of a typical awning system mounted on and extending from a wall of a building.

Referring to FIG. 1 of the drawing, numeral 10 designates a typical pliable awning system consisting of a headbar H secured to a wall 11 of a building, a frontbar F supported by posts 43, a banner P made of pliable awning fabric having opposite edges secured to headbar H and frontbar F and having its under surface secured to rafters 31 joining headbar H to frontbar F at each of the post 43 locations, a drawbar D attached to the front edge of banner P and movably joined to frontbar F as a means for drawing banner P tight and smooth, outbars O further supporting the awning frame at each end post 43 and at interior posts 43 as required, and a fabric valence V which may be integral to banner P or separately mounted along frontbar F.

Figure 2:
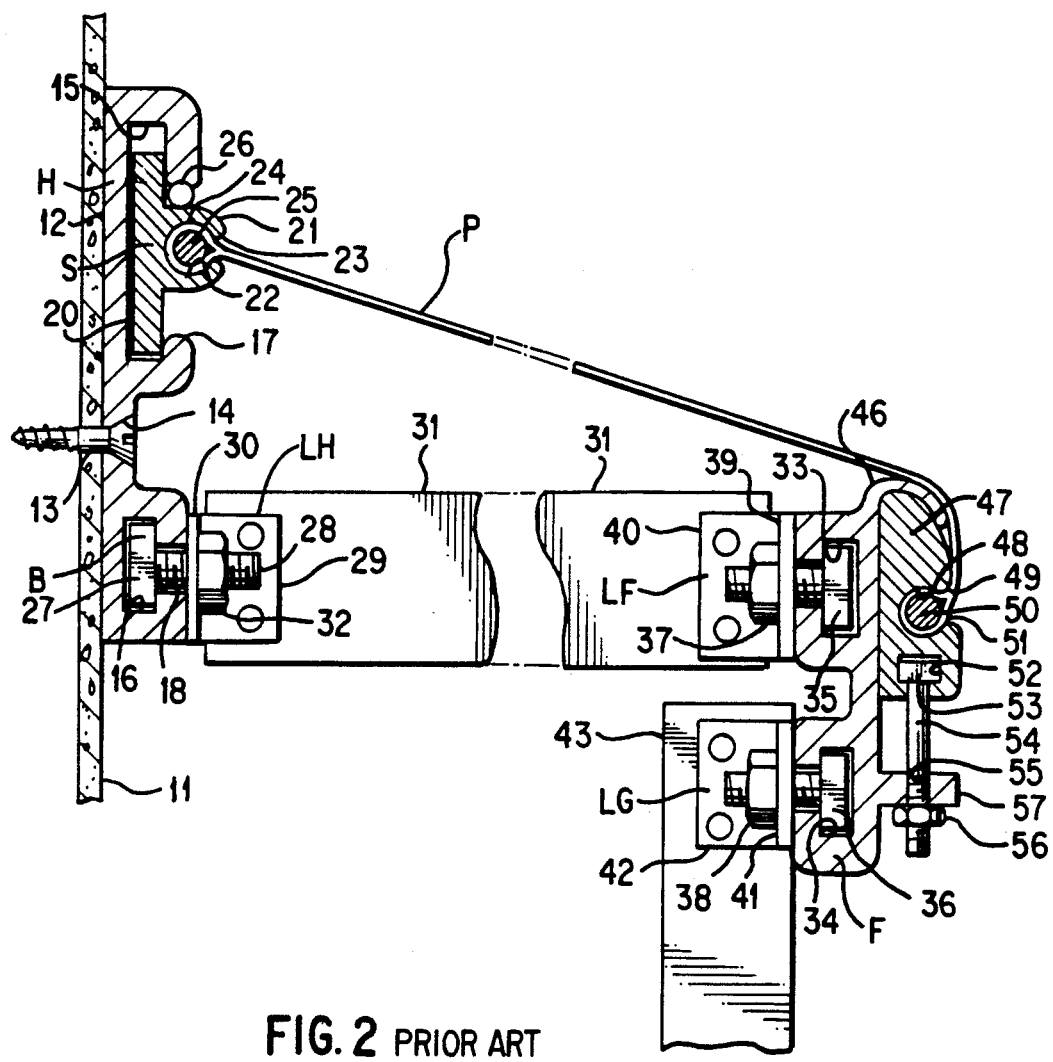
FIG. 2 is a cross-section showing as prior art the pliable awning system disclosed in U.S. Pat. No. 4,192,112.

Prior art in FIG. 2 discloses how pliable awning banner P made of canvas, vinyl coated dacron or nylon, or light sheet metal, most often aluminum, is secured to headbar H which consists of a metal extrusion with a flat back 12 secured to the wall 11 by fasteners 13 through openings 14. Channels 15 and 16 extend the full length of headbar H and have slots 17 and 18 respectively for the insertion of sliding members S and B therein. The sliding member S consists of a flat wall portion 20 that is slidably mounted in channel 15 with an awning securing portion 21 projecting forwardly thereof with a cylindrical bore 22 and opening 23 extending along its full length. The pliable awning banner P is anchored to slide bar S by a loop portion 24 formed at one end of banner P with a dowel 25 received in loop 24 and positioned in bore 22 and extending through opening 23 in the direction of frontbar F. A resilient cylindrical locking member 26 is wedged in position in opening 17 between the upper portion of opening 17 and the top surface anchoring portion 21. Upon removing locking member 26 from headbar H and slidebar S, the slidebar can be lifted and tilted forwardly in channel 15 until the lower end of the flat wall 20 clears the bottom of the opening 17 as shown in FIG. 3.

Within the longitudinal channel 16 at the base of headbar H are inserted a plurality of slide bolts B each consisting of a slide member 27 with a bolt 28 extending forwardly thereof. Received by the bolt is an L-shaped bracket LH having a flange 29 secured to the end of the rafter 31 and the other flange 30 received on bolt 28 and secured thereon by a nut 32 threaded on bolt 28.

Prior art in FIG. 2 also shows how pliable awning banner P is secured to frontbar F by a drawbar 47 with a circular channel 48 slotted 49 to receive a rod 50 inserted through a loop 51 formed on the edge of banner P which is then drawn tight and wrinkle free by turning nut 56 on bolt 54 slidably inserted by its square head 53 into slotted channel 52 and extending through slot 55 in flange 57 of frontbar F. Frontbar F and drawbar 47 are metal extrusions, preferably made of aluminum, both of which extend the full length of the front edge of banner P. Frontbar F is attached to rafter 31 by threaded square headed bolt 35 slipped into slotted channel 33 and extending to securing nut 37 through leg 39 of bracket LF, the other leg 40 of which is secured by welds, rivets or bolts to the rafter 31. Frontbar F is similarly attached to post 43 by threaded square headed bolt 36 slipped into channel 34 and extending to securing nut 38 through leg 41 of bracket LG, the other leg 42 of which issecured by welds, rivets or bolts to post 43. The crown 46 of the frontbar F is convexly formed to distribute the tensioning stresses in banner P and its concave inner surface positions the drawbar 47 during assembly and tightening. In place of rod 50 inserted through loop 51 in slot 49 of channel 48 to attach banner P to drawbar 47, a semi-rigid polypropylene or fiberglass rope sewn or heatsealed to the edge of banner P is often used in modern awning systems.

Figure 3:
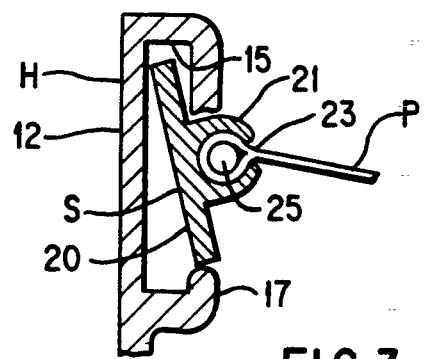
FIG. 3 is a fragment of FIG. 2 showing as prior art the method of attachment of the awning banner to the headbar.
Figure 5:
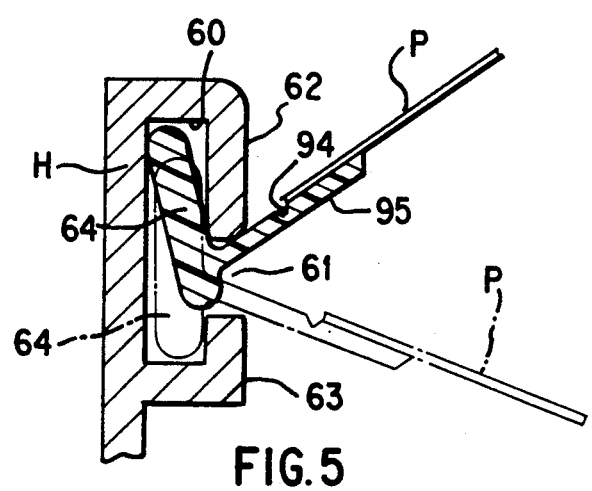
FIG. 5 is a partial view of FIG. 4 showing how the T-shaped plastic strip attached to the edge of the awning banner is inserted into the retaining channel in the headbar extrusion and how it is formed to break away under extreme wind loads.
Figure 4:
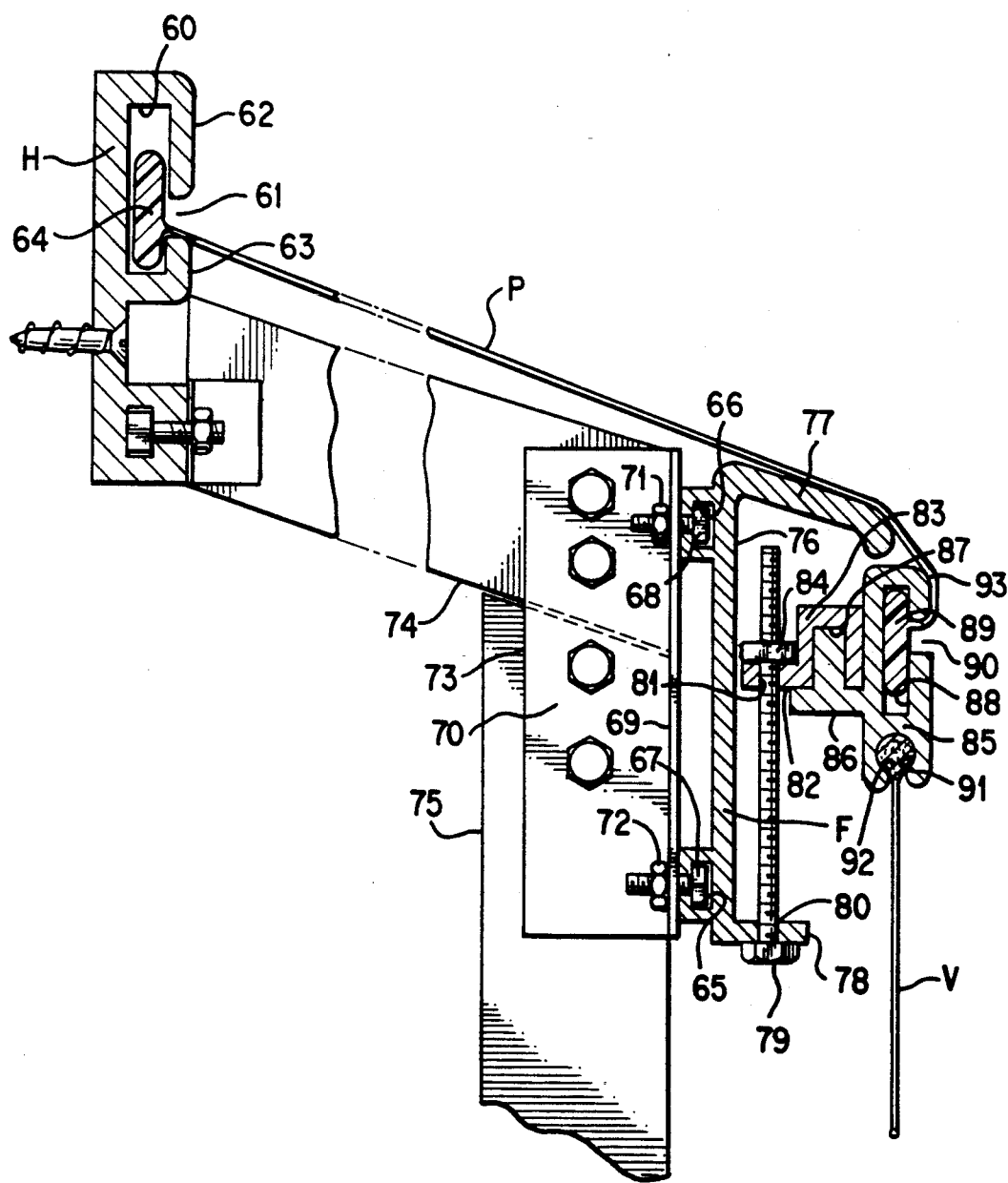
FIG. 4 is a cross-section showing the preferred embodiment of improvements to the pliable awning system disclosed in U.S. Pat. No. 4,192,112.

FIG. 4 discloses the preferred embodiment of improvements to the pliable awning mounting and tensioning system shown as prior art in FIGS. 2 and 3 and described above. In place of the sliding member S with its awning securing portion 21 and its resilient cylindrical locking member 26 inserted into channel 15 to attach banner P to headbar H as shown in FIGS. 2 and 3, the improvements at the headbar in FIG. 4 comprise upper channel 60 with opening 61 created by upper lip 62 proportionately longer than lower lip 63 shaped to receive a strip of molded plastic 64 sewn or heat sealed to the edge of banner P. The proportions of channel lips 62 and 63, the size of the opening 61 and the shape of the plastic edge strip are such that the strip when inserted as shown in FIG. 5 (solid image) will securely retain banner P when it is tightened (dotted image). This plastic edge strip 64 can be inserted directly and easily into the retaining channel 60 and as easily removed once the tension is released at the drawbar 85.

This is an improvement over the prior art shown in FIGS. 2 and 3 which requires that a dowel or rod be inserted into loop 24 at the edge of banner P and then the rod stiffened loop slipped into sliding member S which after insertion into channel 15 must be locked in place with resilient cylindrical locking member 26. Just pressing the resilient locking member 26 into place requires about the same level of effort and difficulty as inserting the plastic mounting strip 64 of the improved system as shown in FIG. 5. Finally, cost and logistical requirements are reduced significantly since three parts in the prior art are replaced by one. It is no more difficult to sew or heat seal plastic edge strip 64 to the edge of the banner P as it is to fabricate loop 24 called for in the prior art. The emergence of strong, conformable, plastic materials makes possible fabrication of a durable, resilient edge strip that can be sewn or heat sealed to modern pliable awning fabrics for use in this method of mounting and removing an awning.

FIG. 4 also shows improvements to frontbar F and drawbar 47 of the prior art shown in FIG. 2. The improved frontbar F is a metal extrusion extending the full length of awning banner P with channels at the bottom 65 and top 66 in which square headed threaded bolts 67 and 68 are positioned for insertion through openings in flange 69 of bracket 70 and secured to flange 69 by threaded nuts 71 and 72. The other flange 73 is welded, riveted or bolted to rafter 74 and post 75. Frontbar F has flat faceplate 76, canted overhang member 77 at the top and slotted flange 78 at the bottom. Threaded tensioning bolt 79 inserted through slot 80 in flange 78 is received by an opening 81 in flange 82 of tensioning clip 83 and screwed into squareheaded threaded nut 84.

Drawbar 85 is a metal extrusion as long as the front edge of awning banner P with an inverted T-shaped flange 86 sized to fit snugly into inverted U-shaped channel 87 of tensioning clip 83. Drawbar 85 has upper rectangular channel 88 into which semi-rigid plastic strip 89 of awning banner P is inserted through slot 90 and lower circular channel 91 into which is slipped polypropylene rope 92 which is sewn into or heat sealed to fabric valence V. Canted overhang member 77 of frontbar F and the upper, outer corner 93 of drawbar 85 are rounded off to relieve stress concentrations in banner P when it is pulled tight by turning tensioning bolt 79 into nut 84 on flange 82 of tensioning clip 83 which pulls down drawbar 85.

Note that drawbar 85 is an extrusion as long as banner P while tensioning clips 83, cut from a metal extrusion, are only as wide as required to withstand the stress generated in flange 82 by tensioning bolt 79. As many tensioning clips are used along the span of drawbar 85 as required to insure a smooth surface on banner P. Because of their extended length when applied to large awnings, drawbars 85 are somewhat flexible. Also large awning banners P made by sewing or heat sealing several pieces of fabric are rarely perfectly square and flat. As a result it is difficult to tighten them to a smooth surface. Using the improvement disclosed in FIG. 4 and described above, clips 83 can be readily mounted on the drawbar's inverted T-shaped flange 86 at any place along the span of drawbar 85 where additional tension is called for to remove wrinkles. Flat face 76 of frontbar F serves to guide flange 82 of clip 83 forced against it by the torsional moment created in pulling down the drawbar 85. As at the headbar H, the insertion of a semi-rigid plastic strip 89, sewn or heat sealed to the edge of banner P, into drawbar channel 88 is less cumbersome and, therefore, more efficient than the method of attachment used in the prior art of FIG. 2 which calls for slipping a dowel or rod 50 through a loop 49 extending the full length of banner P which could be anywhere from ten to sixty feet or more in length and then, in turn, slipping the entire length of the assembled banner loop and rod into the cylindrical channel opening 48 at one end of an equally long drawbar 47. Also, unlike drawbar 47 in the prior art of FIG. 2, improved drawbar 85 makes provision for hanging a decorative valence V. Note, too, that only the head of tensioning bolt 79 shows at the lower flange 78 of the improved frontbar F in FIG. 4, whereas nut 56 and threads of tensioning bolt 53 project below flange 57 of the prior art frontbar F in FIG. 2. Over a long span requiring many tensioning bolts 53 variations in drawdown at each bolt results in some bolts projecting more than others thereby spoiling the appearance of the awning at frontbar F.

FIG. 5 illustrates how T-shaped plastic strip 64 affixed to the edge of awning banner P is inserted directly into upper channel 60 of headbar H in FIG. 4. The inner face of the upper lip of channel 62 is twice the length of the inner face of the lower lip 63 and the opening in channel 61 is only slightly wider than the T-shaped plastic strip 64 to be inserted, the tongue of which is sewn or heat sealed to banner P. Channel 60 is only slightly wider than the plastic strip 64 which is just flexible enough for ease of insertion but not so flexible as to pull through channel opening 61 even under heavy tension. Modern plastics such as polyvinyl chloride can be formulated and cured to provide variable strength and flexibility in selected portions of the cross-section of a shape such as that required for plastic edge strip 64.

The dotted outline of T-shaped plastic strip 64 shows its final position under tension in channel 60 of headbar H. Because of its characteristic pliability, plastic strip 64, when the banner P is pulled tight, effectively seals from the weather opening 61 of channel 60 in headbar H. A similarly shaped plastic strip 89 is used to mount banner P at the frontbar F by inserting it into channel 88 of drawbar 85 in FIG. 4.

FIG. 5 also shows how the T-shaped plastic strip is formed to break away under heavy wind loading of banner P. Plastic strip 64 has a tongue 95 which is notched 94 whereby the inherent strength of the plastic material is reduced to the point that it will tear apart under wind loads which the unnotched tongue 95 would otherwise withstand. Testing notched strips 64 under varied wind loading conditions determines the notch depths required for the banner P to separate from the plastic edge strip 64 at code or otherwise specified wind loadings. Alternatively, break away strength of tongue 95 of the edge strip 64 can be set by varying its thickness, its processing or its chemical formulation.

Figure 6:
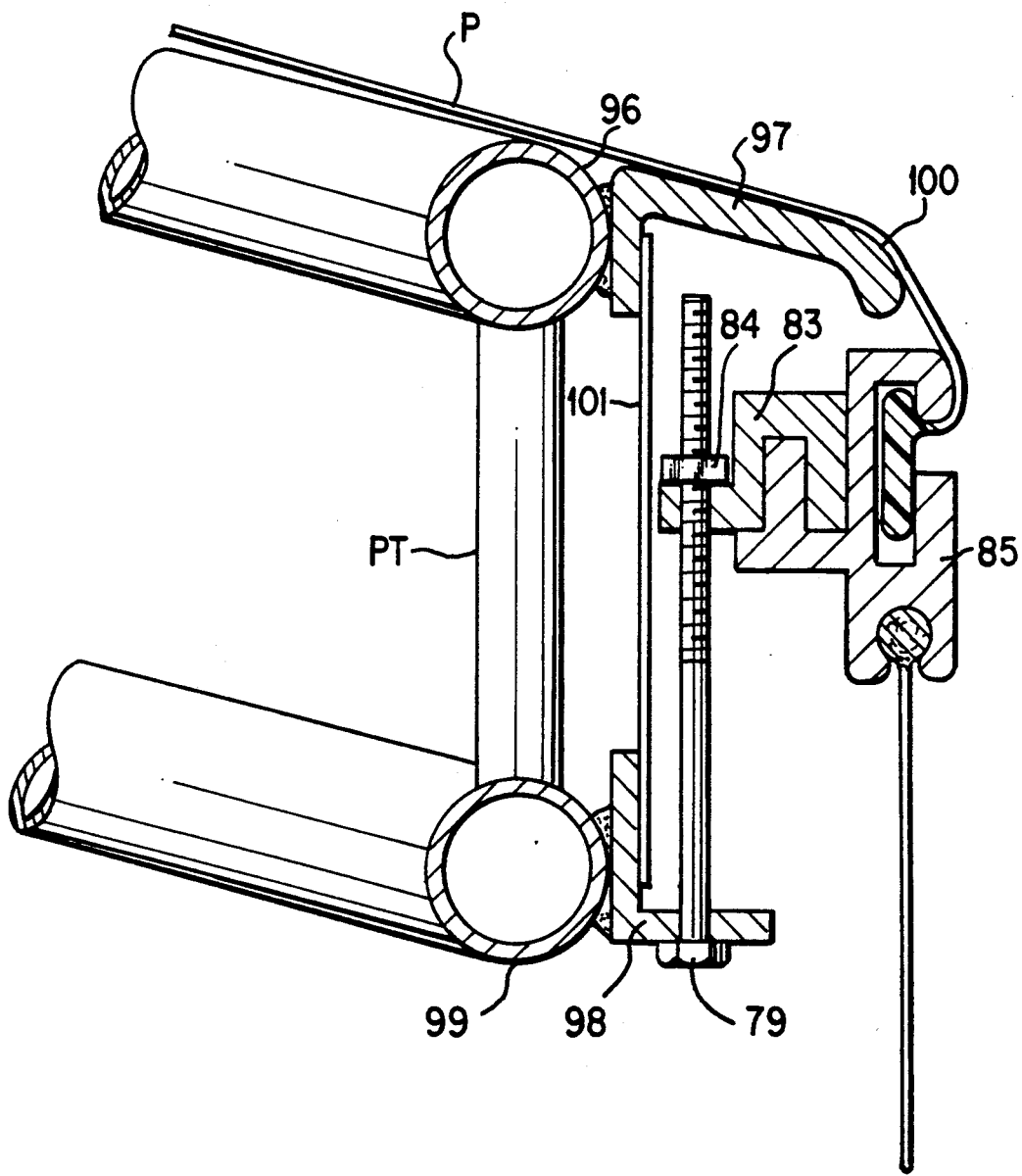
FIG. 6 is a cross-section showing the application of the improved frontbar and drawbar to a pipe-type awning frame.

Older awning systems as well as some currently being installed have frames made of steel pipe and those of long span usually use a pipe-truss for a frontbar to which the banner is laced by cord. FIG. 6 is an embodiment of frontbar and drawbar improvements shown in FIGS. 4 and 5 and described above as applied to a pipe-truss type frontbar PT. Angle iron 97 is attached to upper pipe 96 and angle iron 98 is attached to lower pipe 99 of frontbar truss PT either by welds or bolts. Angle iron 97 is shaped to conform to the pitch of awning banner P and rounded 100 to relieve stresses on banner P as it is pulled tight by tensioning bolt 79 and nut 84, tensioning clip 83 and drawbar 85 as described for the preferred emodiment shown in FIG. 4. At each location where a clip 83 is used to pull down drawbar 85 a guide plate 101 is atached by weld, rivet or bolt to angle irons 97 and 98 to offset assymetric loads resulting from draw down bolt 79 not being in the same plane as banner B which it loads through clip 83 and drawbar 85. This guide plate 101 serves the same function as face 76 of frontbar F in the preferred embodiment shown in FIG. 4.

Adding this improved frontbar with its tensioning means to a typical pipe-truss type frontbar as shown results in easier mounting and removal as well as a much tighter and smoother awning banner than can be achieved by lacing it around pipes. The appearance of the front of the awning is also greatly enhanced.

Figure 7:
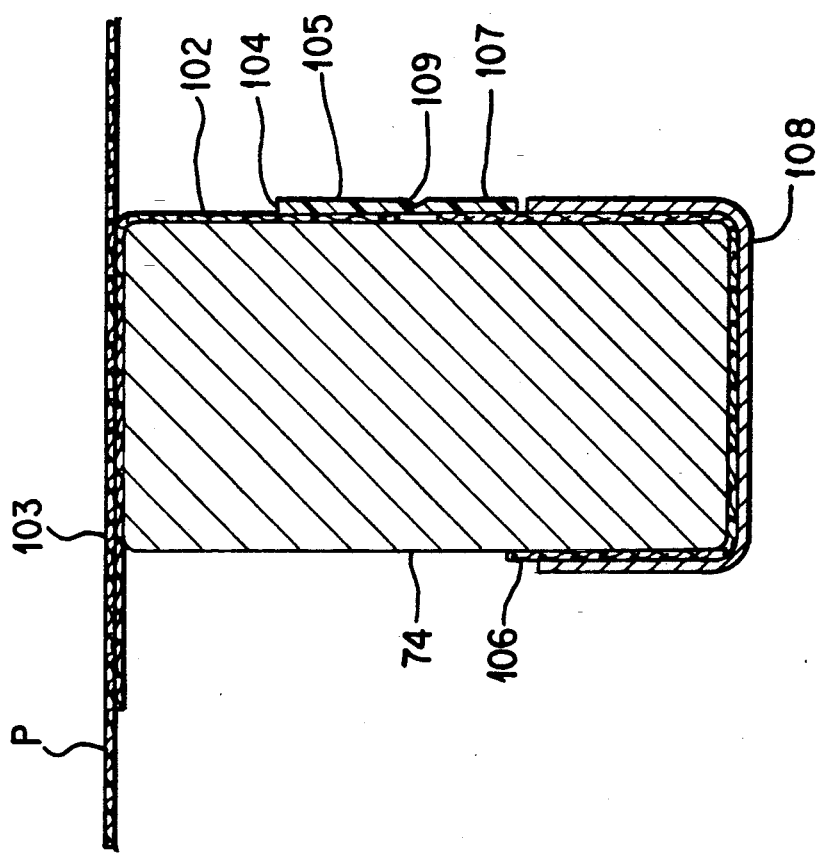
FIG. 7 is a cross-section of a rafter showing how the banner is attached with a flap designed to break away under extreme wind loads.

FIG. 7 shows how banner P can be attached to rafter 74 of FIG. 4 so that it will break away under heavy wind loads. A flap of awning material 102 is heat sealed to banner P at 103 and to a plastic strip 104 at 105. An extension of flap 106 of the same awning fabric material is also heat sealed to plastic strip 104 at 107. The flap 102 and its extension 106 held together by plastic strip 104 and wrapped around rafter 74 is held in place by spring steel clip 108. Flap 102 and its extension 106 can extend the full length of rafter 74 or a number of small flaps similarly assembled with a plastic strip joining the flap with its extension can be heat sealed to banner P at one or more positions along each rafter 74 as required to produce the smoothest awning banner surface. Plastic strip 104 is notched to break away under the same wind loads that would cause banner P to break away at headbar H or drawbar 85. Alternatively, the break away strength of plastic strip 104 can be set by varying its thickness, its processing or its chemical formulation.

Having described my inventive improvements to the prior art as illustrated in the accompanying drawing, what I claim as new and useful and desire to secure by letters patent is:

1. A pliable awning system comprising a headbar with a means of securing it to a building, a plurality of rafters structurally connecting the headbar to a frontbar supported by posts, a pliable fabric awning banner with the full length of its rearward edge attached to the headbar and the full length of its forward edge oppositely attached to a drawbar mounted on the frontbar by means of which drawbar the pliable fabric awning banner is drawn tight and maintained wrinkle free wherein the improvement comprises a frontbar formed with an upper flange with a rounded lip over which the pliable fabric awning banner is drawn tight and smooth by a drawbar incorporating a rectangular channel extruded along its length to receive through a forward opening thereto a semi-rigid plastic strip attached to the full length of the forward edge of the awning banner; a circular channel extruded along its length to receive through a downward opening thereto a semi-rigid plastic rope attached to a pliable fabric valence; an inverted T-shaped flange extending rearward to engage inverted U-shaped channels in a plurality of tensioning clips positioned along its length which clips have rearward extending flanges with openings through which square headed nuts receive threaded tensioning bolts extending to them through openings in a lower flange of the frontbar the flat vertical surface of which restrains the horizontally rearward motion of the tensioning clips mounted on the flange of the drawbar as the threaded tensioning bolts are turned in the square headed threaded nuts to pull down the drawbar thereby tightening and smoothing the awning banner.

2. The pliable awning system recited in claim 1 with the further improvement comprising a semi-rigid plastic strip attached to the full length of the rearward edge of the pliable awning banner and inserted into an extruded channel running the full length of the headbar conformably proportioned to receive and retain it; a semi-rigid plastic strip attached to the full length of the forward edge of the awning banner and inserted into an extruded channel running the full length of the drawbar conformably proportioned to receive and retain it, which semi-rigid plastic strips are attached to the rearward and forward edges of the pliable awning banner by an integrally molded tongue formed to break under predetermined tension caused by heavy wind loads thereby allowing the awning banner to break away at the headbar and at the drawbar.

3. The pliable awning system recited in claim 2 adapted to pipe type awning frames wherein the improvement comprises an upper angle iron attached to the full length of the upper pipe of the front truss of a pipe type awning frame with a rounded lip over which a pliable awning banner is drawn tight by a drawbar incorporating a rectangular channel extruded along its length to receive and retain through a forward opening thereto a semi-rigid plastic strip attached to the forward edge of the awning banner by an integrally molded tongue formed to break away under predetermined wind loads; a circular channel extruded along its length to receive and retain through a downward opening thereto a semi-rigid plastic rope suitably attached to a decorative pliable fabric valence; an inverted T-shaped flange extending rearward to engage U-shaped channels in a plurality of tensioning clips positioned along its length which clips have rearward extending flanges with openings through which square headed nuts receive threaded tensioning bolts extending to them through openings in a lower angle iron attached to the full length of the lower pipe of the front truss of a pipe type awning frame; and, guide plates attached to the vertical flanges of the upper and lower angle irons whereby the horizontally rearward motions of the tensioning clips mounted on the drawbar are restrained as the drawbar is pulled down by rotation of the threaded tensioning bolts in the threaded nuts thereby tightening and smoothing the awning banner.

* * * * *